(12) United States Patent
Wechselberger et al.

(10) Patent No.: US 11,067,432 B2
(45) Date of Patent: Jul. 20, 2021

(54) WEIGHING INSTRUMENT USING A GENERAL-PURPOSE COMPUTER AS THE PRIMARY DISPLAY AND DATA ENTRY

(71) Applicant: Mettler-Toledo, LLC, Columbus, OH (US)

(72) Inventors: Eric V. Wechselberger, Powell, OH (US); Barry McDonald, Galena, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 182 days.

(21) Appl. No.: 16/421,655

(22) Filed: May 24, 2019

(65) Prior Publication Data
US 2020/0370946 A1    Nov. 26, 2020

(51) Int. Cl.
*G01G 23/01*    (2006.01)
*G01G 23/37*    (2006.01)

(52) U.S. Cl.
CPC ....... *G01G 23/017* (2013.01); *G01G 23/3735* (2013.01)

(58) Field of Classification Search
CPC .................. G01G 23/017; G01G 23/3735
See application file for complete search history.

(56) References Cited

U.S. PATENT DOCUMENTS 4,804,052 A * 2/1989 Griffen ................ G01G 19/021
                                                            177/25.14
4,815,547 A * 3/1989 Dillon ................... G01G 3/1406
                                                              177/211

(Continued)

FOREIGN PATENT DOCUMENTS

CN    202002717 U    10/2011
CN    202321420 U    7/2012

(Continued)

OTHER PUBLICATIONS

Mettler-Toledo, LLC, ACM780 Communication Module Technical Manual, Oct. 2017, 298 pages.

(Continued)

*Primary Examiner* — Randy W Gibson
(74) *Attorney, Agent, or Firm* — Standley Law Group LLP; Jeffrey S. Standley; Stephen L. Grant

(57) ABSTRACT

A commercial-transaction weighing instrument (110) subject to W&M legal controls, configured with a weighing platform (12), at least one load cell (16), a controller (120) with weight-processing (122) and communications (124) modules, and software to be implemented on a general-purpose computer with display and data entry capabilities. The general-purpose computer itself is not subject to legal controls. The weight-processing module receives data from the at least one load cell and generates output data in the nature of weight and legally-required weighment information. The communications module receives the output data of the weight-processing module and further transmits the data to a general-purpose computer (136). Software implemented on the general-purpose computer has program code for establishing encrypted bidirectional communication with the communications module and to operate as the primary display device for the weighing instrument. Software implemented on the general-purpose computer also has program code for transmitting signals from the general-purpose computer to the communications module in the nature of data or instructions for the weight processing module.

14 Claims, 2 Drawing Sheets

(56) References Cited

U.S. PATENT DOCUMENTS

| | | | |
|---|---|---|---|
| 6,919,516 B2* | 7/2005 | Frye | G01G 3/1408 |
| | | | 177/132 |
| 7,361,851 B2* | 4/2008 | Brighenti | G01G 23/01 |
| | | | 177/199 |
| 9,581,488 B2 | 2/2017 | Brrang | |
| 10,247,598 B2 | 4/2019 | Moser | |

FOREIGN PATENT DOCUMENTS

| | | |
|---|---|---|
| CN | 106441533 A | 2/2017 |
| CN | 10834-4476 A | 7/2018 |
| EP | 1357368 A2 | 10/2003 |
| EP | 2167925 A1 | 3/2010 |

OTHER PUBLICATIONS

Mettler-Toledo, LLC, Powerful and Intuitive Transaction Management System Vehicle Scale System, Apr. 2018, 2 pages.

\* cited by examiner

WEIGHING INSTRUMENT USING A GENERAL-PURPOSE COMPUTER AS THE PRIMARY DISPLAY AND DATA ENTRY

CROSS-REFERENCE TO RELATED APPLICATIONS

This application is a non-provisional application that makes no claim of priority.

TECHNICAL FIELD

The invention relates to a weighing instrument used in commercial "buy-sell" transactions. Such an instrument is subject to certification by a Weights & Measures (W&M) authority. More particularly, the weighing instrument incorporates the functionality of a general-purpose computer, which is not subject to legal controls, as the primary data entry/display device that is controlled by software which is subject to legal controls.

BACKGROUND ART

Weighing instruments are measuring instruments that determine the mass of an object by measuring the effect of gravity on the object. Because of the need for regularity in certain weights and measures, national and international organizations have established standards that designate the various functions of a weighing instrument and how each operates.

In an exemplary weighing instrument of the prior art, a weigh platform is associated with at least one load cell. These load cells react to a force imposed on them by an object on the weigh platform, including a force imposed by the weigh platform itself. In a weighing instrument subject to W&M control, the weigh instrument is configured to indicate any tampering. A control module of the weighing instrument is in communication with each of the at least one load cells. In the prior art, the control module has a primary data entry/display device associated with it. In some instances, the data entry functionality of the primary data entry/display device may be incorporated into the primary display, such as in a touch screen that has a touch pad for data entry. In a weighing device subject to W&M control, the primary display and keyboard are part of the instrument subject to control. In some cases, a secondary data entry/display feature is achieved by a personal computer in secure bi-directional communication with the control module.

In the known art, a number of peripheral devices may be in communication with the control module, either directly or through a personal computer that is serving as the secondary data entry/display device. These devices include, for illustrative purposes, printers, secondary displays, data storage devices and other peripheral devices, which can include personal computers. In the current time, a personal computer can be a desktop, a laptop, a notebook, a tablet, or a smartphone. Due to this configuration there may be some hardware redundancy between the weighing instrument and peripheral devices.

An unresolved problem of the known prior art is to provide a control module for a weighing instrument where the primary data entry/display functionality is subsumed into a peripheral device while maintaining compliance with legal W&M controls, so that hardware redundancy is reduced.

SUMMARY

This problem, as well as others, is resolved by an instrument for weighing an object in a commercial transaction, calibrated and subject to legal controls, where the primary display functionality is subsumed by a peripheral device, typically a general-purpose computer that is outside of the legal controls. The weighing instrument has a weighing platform, sized and adapted to receive the object, at least one load cell on which the weighing platform bears, a controller and software, where the software is implemented on the general-purpose computer.

The controller has a weight-processing module and a communications module. The weight-processing module is in communication with each of the at least one load cells to receive output signals therefrom and to generate weight and weighment information output data from those output signals. The communications module is in bi-directional communication with the weight processing module to receive weight output signals and legally required weighment information from the weight-processing module. It also transmits data or instructions to the weight-processing module.

Separate from the communication with the weight-processing module, the communications module is in bi-directional encrypted communication with the general-purpose computer, which is not subject to legal controls.

The software implemented on the general-purpose computer has program code for, among other things, establish encrypted bidirectional communication with the communications module, transmit signals from the general-purpose computer to the communications module in the nature of data or instructions for the weight processing module, receive the weight and weighment information output data from the communications module; and display the weight and weighment information output data on the general-purpose computer as a primary display.

In some embodiments, the weigh platform is arranged as a truck weigh station with a plurality of load cells receiving the weight of the weigh platform and the object on the platform. Other applications of the inventive concept are found in industrial weighing transactions, as well as in other situations involving W&M regulation.

The embodiments of the inventive concept may utilize many types of general-purpose computers, including personal computers, such as notebook computers, laptop computers, tablet computers, and smart phones.

In some embodiments, the software establishes the bidirectional communication between the controller, especially a wireless router therein, and the general-purpose computer through a wireless protocol such as Wi-Fi or Bluetooth.

In the embodiments, the weight and weighment output data received by the general-purpose computer through the software implemented thereon include all legally-required data, including the weight being measured, the units of measure of the weight being measured, the weight mode, whether gross or net, the center of zero indication, the weight capacity of the weighing instrument; and the increment size associated with the weight capacity.

Typically, the software implemented on the general-purpose computer uses a unique identifier of the controller to establish the bidirectional communication therewith.

In some embodiments, the software permits the general-purpose computer to establish bidirectional communication with more than one controller at a time.

BRIEF DESCRIPTION OF THE DRAWINGS

A better understanding of the inventive concept will be obtained by reference to the embodiments disclosed in the detailed description and drawings, identical parts are identified by identical reference numerals and wherein.

DETAILED DESCRIPTION OF THE EMBODIMENTS

Figure 1:
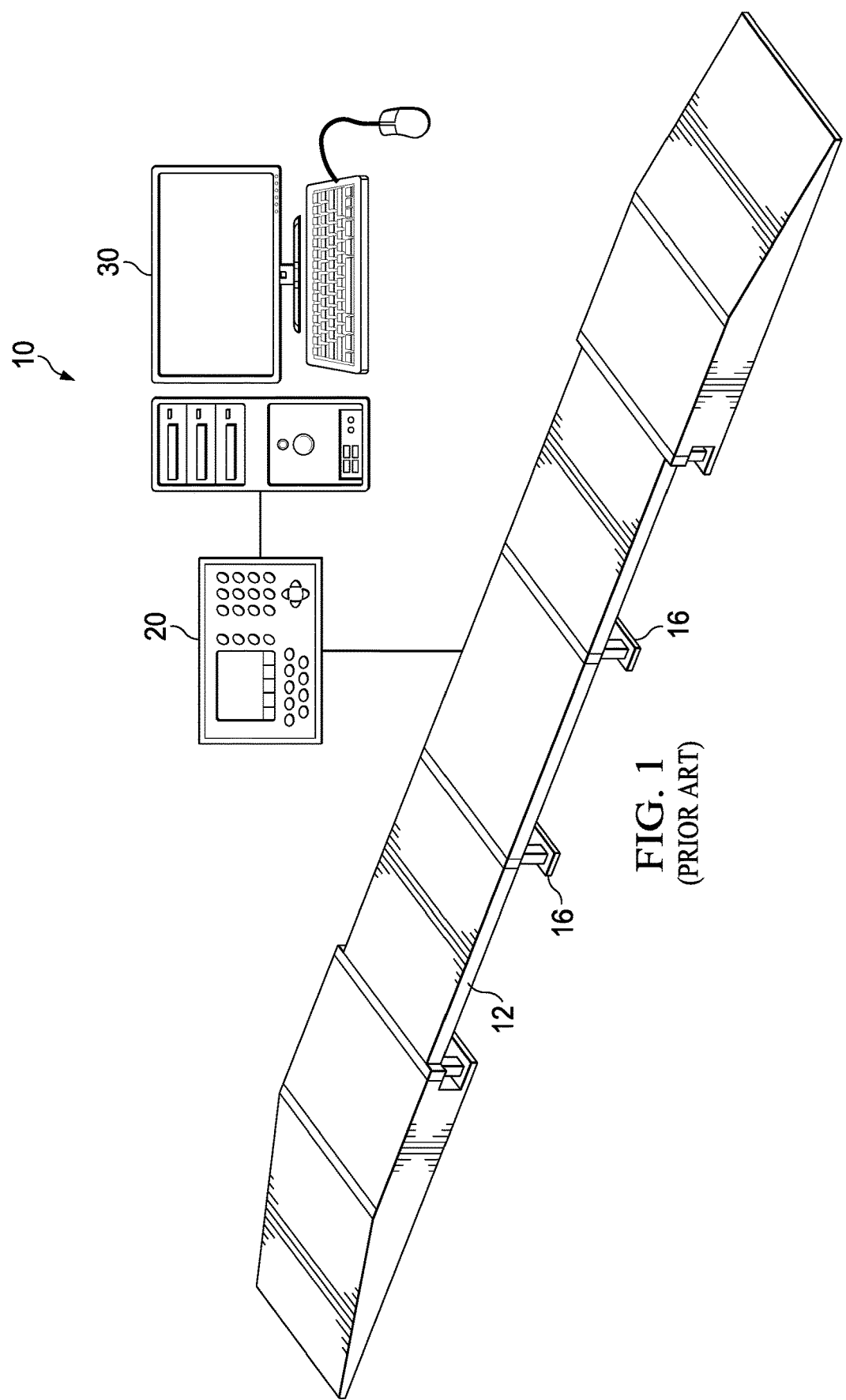
FIG. 1 is a schematic illustration of a weighing instrument of the prior art

FIG. 1 illustrates schematically a weighing instrument 10 for commercial transactions as known in the prior art. The weighing instrument 10 has a weighing platform 12, a plurality of load cells 16 associated with weighing platform, a weight processing and communications module 20, in communication with the load cells, a data entry device and a primary display. Additionally a personal computer 30, with keyboard and display, may also be connected to the weighing instrument as a peripheral device.

The weighing platform 12 performs the functions of mechanical and electrical connecting elements for the weighing instrument 10. The connections between components can be achieved with physical wires or wireless telecommunication, but are typically done with physical wires. The weighing platform 12, on which the object to be weighed is positioned, is associated with at least one load cell 16, each of which is acted on by the gravity force exerted by the object being weighed (as well as the weight of the weighing platform). Each load cell 16 provides an output signal, which may be an analog output signal, or, if the load cell includes an analog-to-digital converter, a digital output signal. If the output signal is analog, the weight processing and communications module 20 will perform the analog-to-digital conversion. The weight processing and communications module 20 is also responsible for basic data processing, secondary data processing, and providing an interface to peripheral devices for the weighing instrument. All of these devices are calibrated and sealed, subject to legal controls, in the prior art weighing instrument 10.

This primary data entry/display device 20 needs to be able to provide a variety of data to an operator of the weighing system 10. These include at least the following: the weight being measured, the units of measure of that weight, the weight mode (either gross or net), the center of zero indication, the weight capacity of the weighing instrument, and the increment size associated with the weight capacity. In some weighing instruments, multiple ranges of capacity are able to be selected by the operator. In these weighing instruments, the primary data entry/display device is able to indicate which other capacities and increments are available, as well as which capacity and increment is currently in use.

Figure 2:
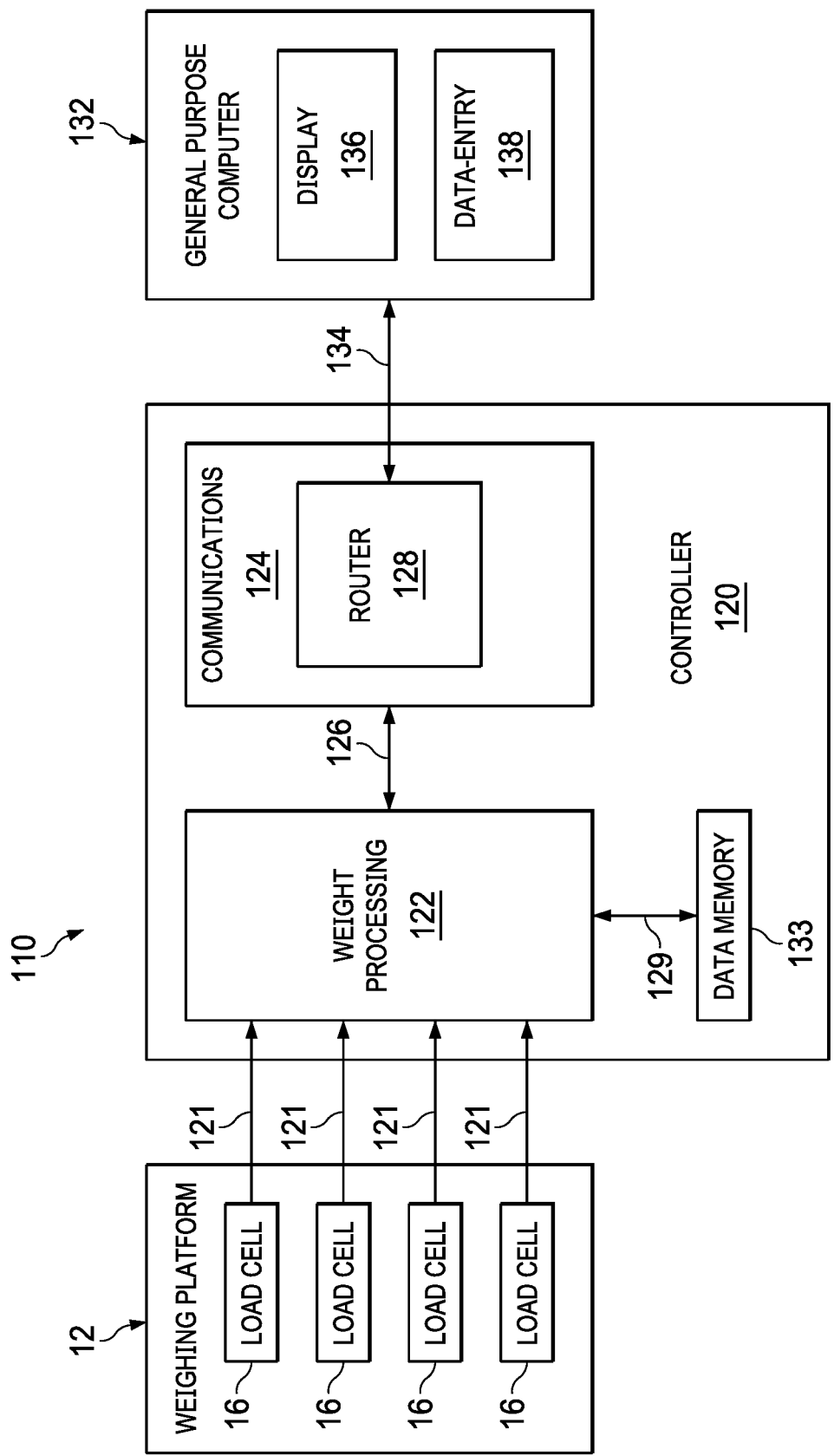
FIG. 2 is a schematic illustration of an embodiment of a weighing instrument utilizing the inventive concept.

FIG. 2 illustrates schematically a weighing instrument embodiment 110 that embodies the inventive concept. In this instance, the weighing platform 12 is depicted as a "black box" because it comprises the same mechanical and electrical elements known in the art and described above with regard to FIG. 1, although the plurality of load cells 16 are shown within the weighing platform 12. In the inventive concept, the prior art weight processing and communication module is replaced by a controller 120, which is calibrated and sealed subject to legal controls, as is the weighing platform 12. The controller 120 is depicted as being without a primary data entry/display device and particularly as being without a display or data entry capability on the body of the controller. That functionality has been shifted in the inventive concept. The controller 120 comprises a weight processing module 122 and a communications module 124. The respective modules 122, 124 are in bi-directional communication through connection 126, which is totally contained within the calibrated and sealed controller. The weight-processing module 122 is also in communication, through hard-wired communication lines 121, with each of the load cells 16. Communications module 124 comprises at least one means 128 for receiving and transmitting data, wirelessly or through physical wires, to a remote device, preferably a general-purpose computer 132. In some embodiments, this means 128 for wirelessly receiving and transmitting can be a wireless router for using a Wi-Fi wireless protocol; in other embodiments, the means can use a BLUETOOTH wireless protocol. Still other wireless protocols will be known and will be readily able to be incorporated into the communications module 124. The bi-directional communication between the communications means 128 and the general-purpose computer 132 is represented by two-headed arrow 134. The weighing instrument 110 is characterized by the absence of a physical display and/or data entry feature on the controller 120, which was present in the prior art.

The general-purpose computer 132 is enabled by the existence of software code, implemented on both the general-purpose computer and on the communications module 124, as will be described below. The general-purpose computer 132 has a display 136 and a data entry 138, but, in some instances, display and data entry may be accomplished by the same feature of the general-purpose computer, as with a touch-screen. However, the general-purpose computer 132 should be broadly understood to range in scope from a tower-type personal computer having a display device and keyboard that are separate from a central processing unit (CPU) to a laptop computer, a desktop computer, a notebook computer that relies upon internet connectivity, a tablet device where the display screen doubles as a touch screen for data entry and a smartphone. Due to the use of the software, the inventive concept should be applicable to new types of general-purpose computers 132, as these are developed. When the communications module 124 is connected with such a general purpose computer 132, through communications means 128 via wireless or hard-wired communications protocol, as shown by arrow 134, the data entry capability and display capability of the general purpose computer effectively become a primary keyboard and display for the weighing instrument 110, with the difference being that a given weighing system may be connected at different times with different general purpose computers and, at least as importantly, a single general purpose computer may be connected to more than one weighing instrument. Expressed somewhat differently, a single general-purpose computer 132 can be used, either concurrently or serially, with more than one weighing instrument 110 and more than one general purpose-computer 132 can be used with a particular weighing instrument.

These objects are achieved specifically by the software installed on the general-purpose computer 132 and on the controller 120, but specifically on the communications module 124 in a manner that does not cause any conflict with the weights and measures (W&M) regulations. The software on the general-purpose computer 132 and on the communications module 124 co-act to convert input from a user of the general-purpose computer 132 into a digital data transmission to the communications module 124. The software also converts output information received by the communications module 124 from the weight processing module 122 for transmission to the general-purpose computer 132. Preferably, all software needed to place the data received by the general-purpose computer 132 into a display format that is properly sized and compatible with the device is resident on the general-purpose computer. For example, the display size and format can be adjusted. Because the general-purpose computer 132 never communicates directly with software on the weight-processing module 122, where the legally-relevant software resides, it is unable to affect the software on the weight-processing module. This protects the legally-relevant software from being altered. Another feature disclosed in FIG. 2 is a data memory 133 that is in direct communication, as shown by bi-directional arrow 129, with the software on the weight-processing module 122, to comply with W&M requirements to log all modifications that are made. These provisions ensure that the weight and other information exchanged between the general-purpose computer 132 and the controller 120 are legitimate.

Attention is now directed to the software product that enables the control module to operate without a dedicated primary data entry/display device. In one embodiment of the inventive concept, the current version of the software is maintained on a secured website and may be downloaded by a user through access to the website using a web browser. This download may be to the general-purpose computer 132 selected by the user. Once installed on a user's general-purpose computer 132, the software can establish contact with a specific controller 120, preferably using a unique identifier assigned to the controller. Since the software is maintained on a secured website associated with the vendor of the weighing systems, any updates in the software would be available when made, by download to a user. In one embodiment of the inventive concept, the software product may be available in a single workstation version and a multiple workstation version.

What is claimed is:

1. An instrument (110) for weighing an object in a commercial transaction, calibrated and subject to legal controls, comprising:
    a weighing platform (12), sized and adapted to receive the object;
    at least one load cell (16) on which the weighing platform bears;
    a controller (120), comprising:
        a weight-processing module (122), in communication with each of the at least one load cells to receive output signals therefrom and to generate weight and weighment information output data; and
        a communications module (124) in bi-directional communication with the weight processing module to receive weight output signals and legally required weighment information therefrom and to transmit data or instructions thereto, the communications module further in bi-directional encrypted communication with a general purpose computer (136) that is not subject to legal controls to receive data therefrom and to transmit data thereto; and
    software, implemented on or externally hosted for the general-purpose computer, the software having program code for:
        establishing encrypted bidirectional communication with the communications module;
        transmitting signals from the general-purpose computer to the communications module in the nature of data or instructions for the weight processing module;
        receiving the weight and weighment information output data from the communications module; and
        displaying the weight and weighment information output data on the general-purpose computer as a primary display.

2. The weighing instrument of claim 1, wherein the weighing platform is arranged as a truck weigh station.

3. The weighing instrument of claim 1, wherein the general-purpose computer is a personal computer.

4. The weighing instrument of claim 1, wherein the general-purpose computer is a smart phone.

5. The weighing instrument of claim 1, wherein the general-purpose computer is a tablet computer.

6. The weighing instrument of claim 3, wherein the personal computer is a notebook computer.

7. The weighing instrument of claim 3, wherein the personal computer is a laptop computer.

8. The weighing instrument of claim 3, wherein the personal computer is a desktop computer.

9. The weighing instrument of claim 1, wherein the software establishes the bidirectional communication between the controller and the general-purpose computer through a Wi-Fi wireless protocol.

10. The weighing instrument of claim 1, wherein the software establishes the bidirectional communication between the controller and the general-purpose computer through a Bluetooth wireless protocol.

11. The weighing instrument of claim 1, wherein the weight and weighment output data received by the general-purpose computer through the software implemented thereon comprise:
    the weight being measured;
    the units of measure of the weight being measured;
    the weight mode, whether gross or net;
    the center of zero indication;
    the weight capacity of weighing instrument; and
    the increment size associated with the weight capacity.

12. The weighing instrument of claim 1, wherein the software implemented on the general-purpose computer uses a unique identifier of the controller to establish the bidirectional communication therewith.

13. The weighing instrument of claim 12, wherein the software permits the general-purpose computer to establish bidirectional communication with more than one controller at a time.

14. The weighing instrument of claim 1, wherein the communications module uses a wireless router for the bi-directional encrypted communication with the general purpose computer.

* * * * *